United States Patent [19]
Nishimichi et al.

[11] Patent Number: 5,835,505
[45] Date of Patent: Nov. 10, 1998

[54] SEMICONDUCTOR INTEGRATED CIRCUIT AND SYSTEM INCORPORATING THE SAME

[75] Inventors: Yoshito Nishimichi, Higashiosaka; Satoshi Ogura, Moriguchi; Shinji Ozaki, Osaka; Seiji Tokunoh, Settsu; Akira Miyoshi, Hirakata; Hiroaki Yamamoto, Osaka; Yoshiaki Kasuga, Shiga-gun, all of Japan

[73] Assignee: Matsushita Electric Industrial Co., ltd., Osaka, Japan

[21] Appl. No.: 843,581

[22] Filed: Apr. 16, 1997

[30] Foreign Application Priority Data

Apr. 19, 1996 [JP] Japan .................................. 8-098272

[51] Int. Cl.⁶ ............................. G01R 31/28; G11C 29/00
[52] U.S. Cl. ........................... 371/22.1; 371/21.1; 365/63
[58] Field of Search ................................... 371/22.1, 22.2, 371/21.1; 395/183.01; 365/63, 201; 257/208, 209, 210

[56] References Cited

U.S. PATENT DOCUMENTS 3,983,619  10/1976  Kubo et al. ............................ 257/207
4,791,609  12/1988  Rto .......................................... 365/63

*Primary Examiner*—Hoa T. Nguyen
*Attorney, Agent, or Firm*—Ratner & Prestia

[57] ABSTRACT

A semiconductor integrated circuit includes a functional block realizing at least part of a function of the semiconductor integrated circuit. The functional block includes a plurality of basic cells and a plurality of terminal cells. Each of the plurality of terminal cells has a connector for mediating a communication between another semiconductor integrated circuit and one of the plurality of basic cells.

18 Claims, 10 Drawing Sheets

SEMICONDUCTOR INTEGRATED CIRCUIT AND SYSTEM INCORPORATING THE SAME

BACKGROUND OF THE INVENTION

1. Field of the Invention

The present invention relates to a semiconductor integrated circuit having a functional block including a plurality of basic cells and a plurality of terminal cells, and a system incorporating the semiconductor integrated circuit.

2. Description of the Related Art

Conventionally, in order to aid a debug for software of an embedded control system using a microprocessor, a semiconductor integrated circuit device used for evaluation (hereinafter, simply referred to as an "evaluation chip") which fetches and externally monitors internal information in a chip required for the debug has been developed. A real-time emulator system uses the internal information obtained by the evaluation chip to realize a program break function, a real-time trace function, a real-time emulation function and a performance evaluation coverage function, and the like.

FIG. 10A is a plan view showing a conventional evaluation chip 102a. The evaluation chip 102a includes signal terminals 60a, 60b and 60c in addition to signal terminals 61 which are required in order to perform a normal operation of the evaluation chip 102a. These signal terminals are arranged in a ring-like configuration around the periphery of the evaluation chip 102a.

The signal terminals 60a, 60b and 60c are used for externally monitoring an internal signal in the evaluation chip 102a. For example, the signal terminals 60a are connected to a CPU and a data RAM via wires 66a so as to monitor internal data of the evaluation chip 102a. The signal terminals 60b are connected to the CPU and an instruction ROM via wires 66b so as to monitor an internal instruction of the evaluation chip 102a. The signal terminals 60c are connected to a debug control section via wires 66c so as to monitor debug control information.

A same type of evaluation chip as the evaluation chip 102a is described, for example, in Nikkei Electronics, Mar. 13, 1995, pp. 21–22.

FIG. 10B is a plan view showing another conventional evaluation chip 102b. The evaluation chip 102b includes debug functions such as a program break function, a real-time trace function and a performance evaluation coverage function. The evaluation chip 102b allows high-speed signals to be used only in the evaluation chip 102b and thus the debug functions can be realized at a high frequency.

A same type of evaluation chip as the evaluation chip 102b is described, for example, in Nikkei Electronics, Dec. 5, 1994, pp. 99–109.

In the evaluation chip 102a shown in FIG. 10A, the wires 66a, 66b and 66c need to be drawn from the functional blocks in the evaluation chip 102a to the signal terminals 60a, 60b and 60c arranged around the periphery of the evaluation chip 102a. The wires 66a, 66b and 66c should have a particular bit width (e.g., 32 bits) since internal signals having the particular bit width need to be monitored in order to realize the real-time trace function and the real-time emulation function.

The wires 66a, 66b and 66c used for connecting the functional blocks and the signal terminals 60a, 60b and 60c require substantially large regions for wiring at channels between the functional blocks. Furthermore, the signal terminals 60a, 60b and 60c are additionally provided in the periphery of the evaluation chip 102a. Accordingly, the size of the evaluation chip 102a is increased which results in deterioration of a production yield.

Therefore, such conventional evaluation chips are not suitable to be mass-produced. Thus, conventionally, it is general to develop an evaluation chip and a mass-produced chip as a pair for each kind of microcontroller chips. Such a development, however, is associated with a problem of a large number of development steps.

Moreover, since the wires 66a, 66b and 66c of the evaluation chip 102a need to be drawn to the periphery of the evaluation chip 102a, the lengths thereof are inevitably and undesirably long. The longer length of the wires causes longer propagation delay of the signals and hinders an enhancement of the operation frequency. The longer length of the wiring is also associated with larger difference in the signal delays between the bits because even when the wires are provided through the same path, the input and output terminals are located at different positions. This gives bad effect in realizing a high-speed real-time emulator system.

Additionally, the internal signals of the evaluation chip 102a are propagated through cables extending from the signal terminals 60a, 60b and 60c to an external device in order to realize the real-time emulator system. The additional delay time of the cables causes further increase in the propagation delay. The increase in the propagation delay makes difficult debugging that uses the same frequency as the operation frequency of the microcontroller chip. The increase in the propagation delay also hinders debugging of software of an embedded control application which mostly deals with critical processing in terms of time such as a response to interruption.

In the case of the evaluation chip 102b shown in FIG. 10B, the problem associated with the operation frequency is less serious compared to that of the evaluation chip 102a. However, it is still necessary to develop a new evaluation chip whenever there is a new change in a version of the microcontroller chip or a configuration of a built-in peripheral chip due to a development of the microcontroller chip. This increases the number of development steps. Thus, the evaluation chip 102b is associated with the same problem as the evaluation chip 102a.

SUMMARY OF THE INVENTION

According to one aspect of the present invention, a semiconductor integrated circuit includes a functional block realizing at least part of a function of the semiconductor integrated circuit. The functional block includes a plurality of basic cells and a plurality of terminal cells. Each of the plurality of terminal cells has a connector for mediating a communication between another semiconductor integrated circuit and one of the plurality of basic cells.

In one embodiment of the present invention, each of the plurality of terminal cells is adjacent to at least one of the plurality of basic cells.

In another embodiment of the present invention, the communication is established by using an internal signal of the semiconductor integrated circuit.

In still another embodiment of the present invention, another semiconductor integrated circuit has a function of processing information required for real-time debugging.

In yet still another embodiment of the present invention, the communication is established by using an external signal of the semiconductor integrated circuit.

In still another embodiment of the present invention, at least two of the plurality of basic cells are arranged in a first predetermined direction.

In still another embodiment of the present invention, at least two of the plurality of terminal cells are arranged in a second predetermined direction.

In still another embodiment of the present invention, an arrangement pitch of each of the terminal cells are equal to an arrangement pitch of each of the basic cells.

In still another embodiment of the present invention, a width of each of the terminal cells is equal to a width of each of the basic cells.

In still another embodiment of the present invention, an arrangement pitch of each of the terminal cells is larger than an arrangement pitch of each of the basic cells.

In still another embodiment of the present invention, the functional block includes a region for a control circuit to be formed. At least one of the plurality of terminal cells is provided in at least part of the region.

In still another embodiment of the present invention, each of the plurality of terminal cells is arranged in zigzags.

In still another embodiment of the present invention, each of the plurality of terminal cells is any one of an input terminal cell, an output terminal cell and an input and output terminal cell.

According to another aspect of the present invention, a system includes a first semiconductor integrated circuit, a second semiconductor integrated circuit and a connecting medium for connecting the first semiconductor integrated circuit and the second semiconductor integrated circuit. The first semiconductor integrated circuit includes a functional block realizing at least part of a function of the first semiconductor integrated circuit. The functional block includes a plurality of basic cells and a plurality of terminal cells. Each of the plurality of terminal cells has a connector for mediating a communication between the second semiconductor integrated circuit and one of the plurality of basic cells. The second semiconductor integrated circuit has a function of processing information required for real-time debugging.

In one embodiment of the present invention, the connecting medium is a bump.

In another embodiment of the present invention, the first semiconductor integrated circuit is one selected from a plurality of semiconductor integrated circuits. The second semiconductor integrated circuit has a function of processing information required for real-time debugging any one of the plurality of semiconductor integrated circuits.

In still another embodiment of the present invention, a connecting layer of the second semiconductor integrated circuit is provided so as to adapt a connecting layer of the one selected from the plurality of the semiconductor integrated circuits.

In yet still another embodiment of the present invention, a connecting layer of the second semiconductor integrated circuit is provided so as to adopt all of the plurality of semiconductor integrated circuits.

Thus, the invention described herein makes possible the advantages of (1) providing a semiconductor integrated circuit having minimum influence associated with an increase in a size of an area and an increase in line delay of a chip, and a system incorporating the semiconductor integrated circuit and (2) providing an evaluation chip that can be mass-produced by reducing the number of development steps.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
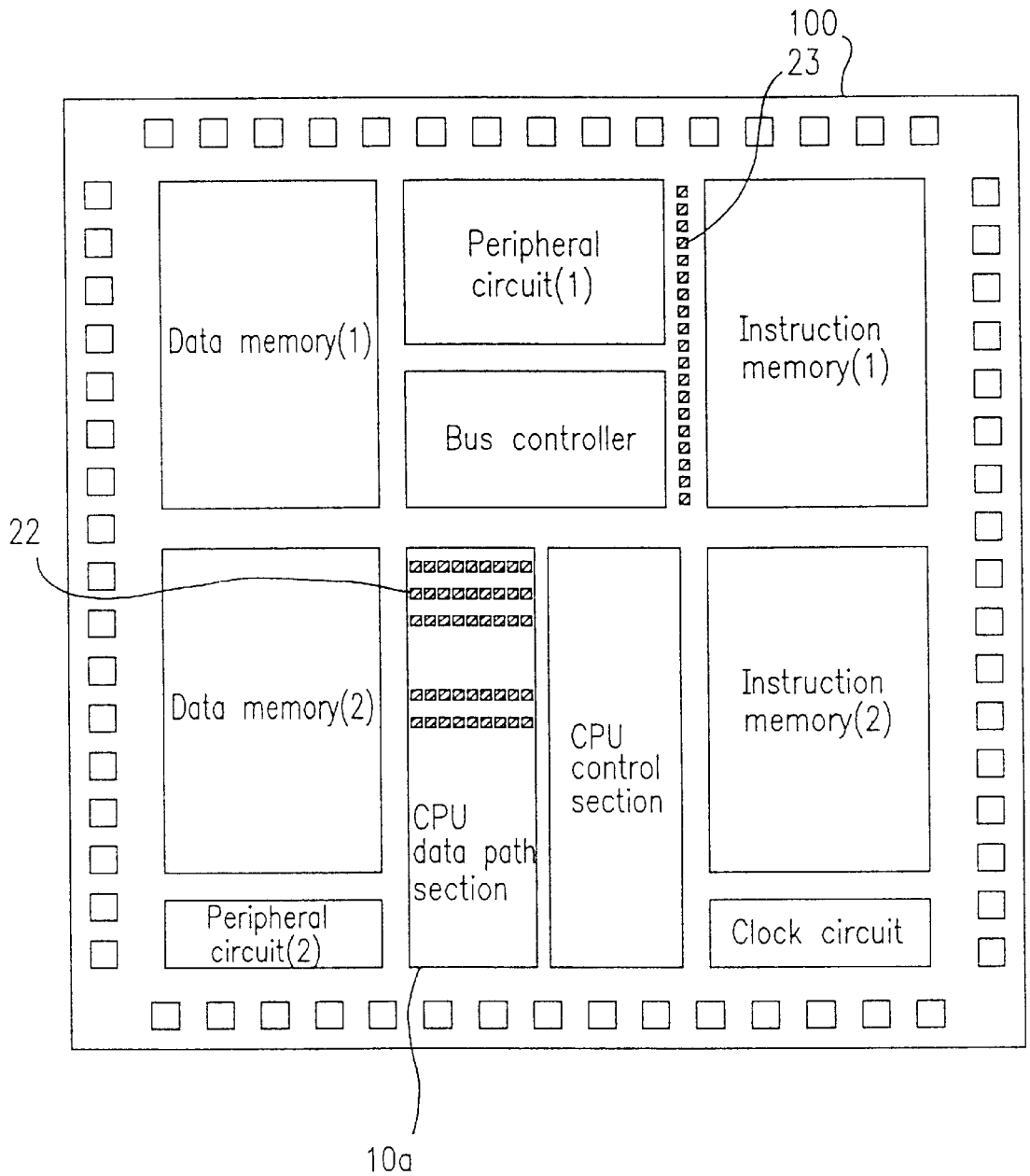
FIG. 1 is a plan view showing a configuration of a microcontroller chip according to a first example of the present invention.

FIG. 1 is a plan view showing a configuration of a microcontroller chip 100 according to a first example of the present invention. The microcontroller chip 100 includes a plurality of functional blocks. Each of the plurality of functional blocks realizes at least a part of the functions of the microcontroller chip 100. The functional block 10a corresponds, for example, to a CPU data path section. The functional block 10a includes a plurality of terminal cells 22 which will be discussed later.

The CPU data path section includes, for example, an instruction fetch-associated function including a program counter indicating an address of a program being executed, an arithmetic operation-associated function for performing an arithmetic operation between data or calculating an operand address by using a general resister or an ALU and a load/store-associated function for transferring data to and from an externally provided memory. Since these functions process instructions or data having a particular bit width (herein, 32 bits), it is considered most efficient to arrange each row of bits in a logically and physically regular manner.

Figure 2:
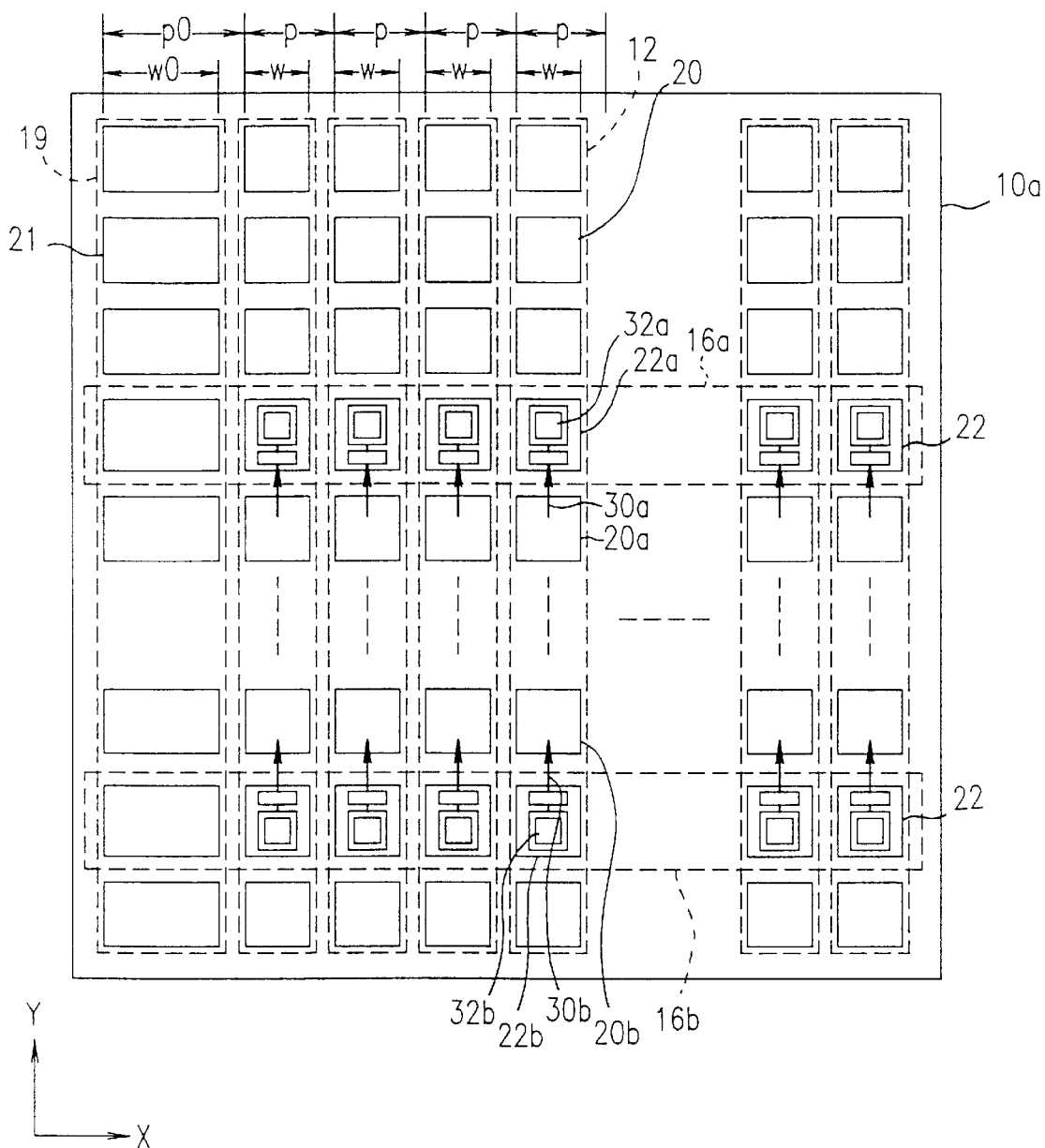
FIG. 2 is a plan view showing a configuration of basic cells and terminal cells in a functional block in the microcontroller chip according to the first example of the present invention.

FIG. 2 is a plan view showing a configuration of the functional block 10a. The functional block 10a includes a plurality of data columns 12. Each of the plurality of the data columns 12 extends in a direction represented by an arrow indicated as Y in FIG. 2 (hereinafter, simply referred to as "Y-direction") and is regularly arranged with a pitch p in a direction represented by an arrow indicated as X in FIG. 2 (hereinafter, simply referred to as "X-direction").

Each of the plurality of data columns 12 corresponds to 1 bit in a signal having 32 bit widths. For example, in FIG. 2, the left data column 12 corresponds to bit 0 of the signal and the right data column 12 corresponds to bit 31 of the signal.

Each of the plurality of data columns 12 includes a plurality of basic cells 20 and at least one terminal cell 22. Each of the basic cells 20 and the terminal cells 22 has a width w. Herein, the width w refers to a length in X-direction.

The terminal cells 22 are used to mediate a communication between the basic cells 20 and a chip other than the microcontroller chip 100 (for example, an emulator chip). The terminal cells 22 are classified into terminal cells for inputting signals into the microcontroller chip 100 (input terminal cells), terminal cells for outputting signals from the microcontroller chip 100 (output terminal cells) and terminal cells for inputting and outputting signals into and from the microcontroller chip 100 (input and output terminal cells). Hereinafter, the output terminal cell, the input terminal cell and the input and output terminal cell are referred to as a terminal cell 22a, a terminal cell 22b and a terminal cell 22c, respectively.

FIGS. 8A through 8D are schematic views showing configurations of each of the terminal cells 22a, 22b and 22c.

Figure 8A:
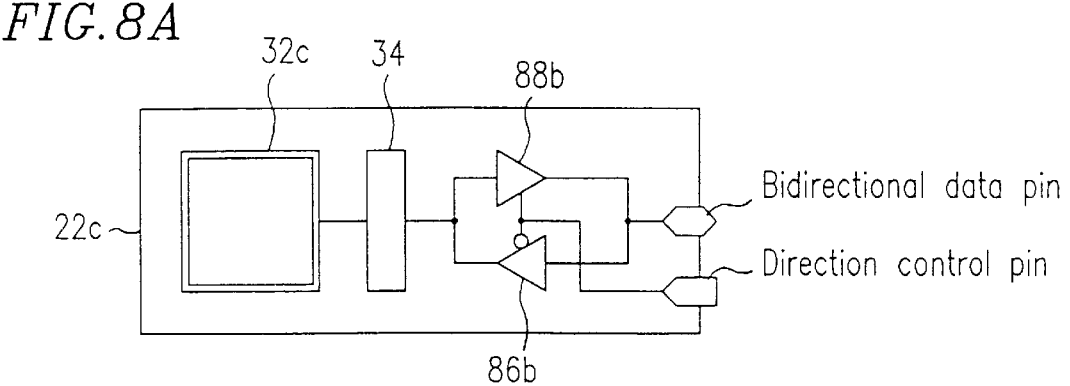
FIGS. 8A through 8D are schematic diagrams each showing an arrangement of a terminal cell.

FIG. 8A shows the configuration of the terminal cell 22c for inputting and outputting signals. The terminal cell 22c includes a connector 32c for connecting the terminal cell 22c to an external chip, a protection circuit 34 and active elements 86b and 88b. The active element 86b is a driver circuit for driving a load. The active element 88b is an input buffer circuit for amplifying an input signal.

Figure 8B:
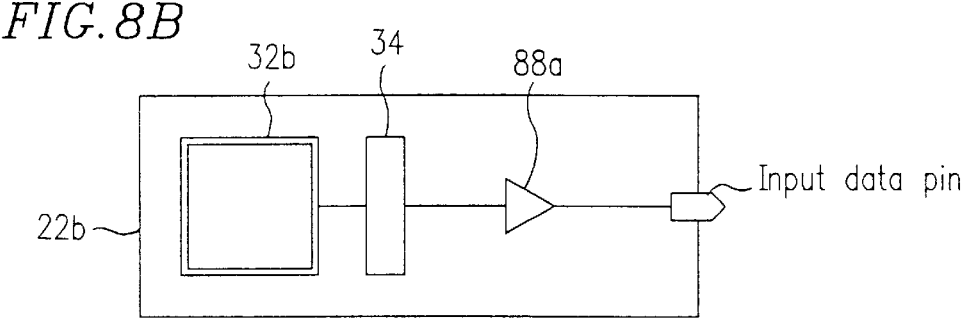

FIG. 8B shows the configuration of the terminal cell 22b for inputting signals. The terminal cell 22b includes a connector 32b for connecting the terminal cell 22b to an external chip, a protection circuit 34 and an active element 88a. The active element 88a is an input buffer circuit for amplifying an input signal.

Figure 8C:
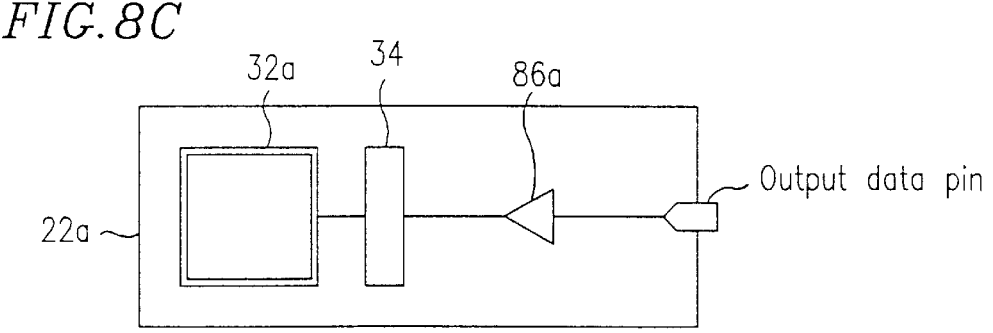

FIG. 8C shows the configuration of the terminal cell 22a for outputting signals. The terminal cell 22a includes a connector 32a for connecting the terminal cell 22a to an external chip, a protection circuit 34 and an active element 86a. The active element 86a is a driver circuit for driving a load.

Figure 8D:
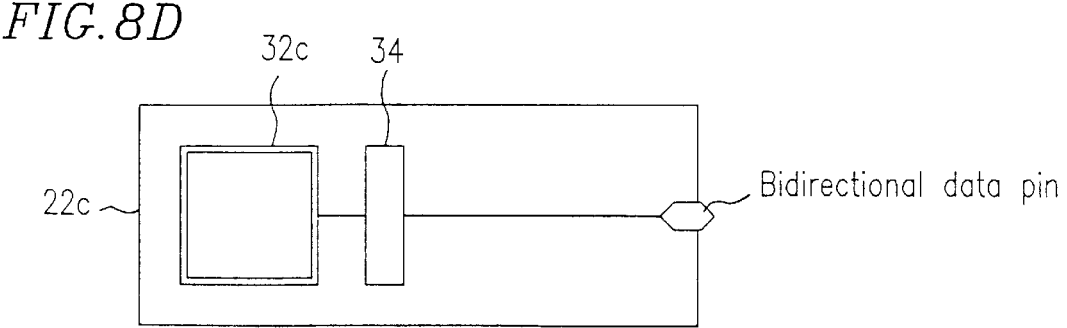

FIG. 8D shows another configuration of the terminal cell 22c for inputting and outputting signals. The terminal cell 22c includes a connector 32c for connecting the terminal cell 22c to an external chip and a protection circuit 34.

The protection circuit 34 is realized, for example, by connecting a resistance element or the like using a diode connected in a reverse direction, an off-transistor, a wire resistance or a diffusion resistance to the signal terminals in series or in parallel. Alternatively, instead of using the protection circuit 34 as an independent circuit, diffusion capacitance and a parasitic diode formed at a drain section of the output transistors in the driver circuits 86a and 86b for driving loads can be used. Moreover, in the case where it is judged that a protection is not necessary, the protection circuit 34 can be omitted.

The basic cell 20 is a basic unit of processing which corresponds to 1 bit. The basic cell 20 may be a basic logical element such as an AND element or an OR element. Alternatively, the basic cell 20 may be a logical circuit obtained by combining a plurality of basic logical elements. Examples of such a logical circuit include a flip-flop, a multiplexer and a full adder.

Some of the basic cells 20 are connected to the terminal cells 22a, 22b and 22c. Hereinafter, basic cells connected to each of the terminal cells 22a, 22b and 22c are referred to as basic cells 20a, 20b and 20c , respectively.

As shown in FIG. 2, the basic cell 20a is connected to the terminal cell 22a via a wire 30a. The basic cell 20b is connected to the terminal cell 22b via a wire 30b. The wires 30a and 30b extend above the basic cells 20a and 20b, respectively.

The basic cell 20a and the terminal cell 22a connected thereto are arranged in the same data column 12 so as to be adjacent to each other. The basic cell 20b and the terminal cell 22b connected thereto are arranged in the same data column 12 so as to be adjacent to each other. In the present specification, an expression "the basic cell 20 and the terminal cell 22 are adjacent to each other" is defined as a case where the basic cell 20 and the terminal cell 22 are directly connected to each other and in addition to a case where the basic cell 20 and the terminal cell 22 are laid out so as to be adjacent to each other.

A specific example of the basic cell 20a will be described. Herein, the basic cell 20a is assumed to be a resister cell of a program counter. Signals output from the resister cell is supplied to each portion (not shown) in the data path and to the terminal cell 22a via the wire 30a. Accordingly, the content of the resistor cell in the program counter can be monitored from outside of the microcontroller chip 100.

The content of the resistor cell in the program counter indicates the address of the currently executed program. Generally, such an address is information used only in the microcontroller chip 100. Therefore, in order to obtain this information, it is necessary to access the program counter by means of software by using a particular instruction. Specifically, this information cannot be obtained unless, for example, execution of a targeted program is stopped. However, if the information can be obtained in real-time, a real-time trace function can be realized without interrupting the targeted program currently executed by the microcontroller chip 100.

Hereinafter, a specific example of the basic cell 20b will be described. Herein, the basic cell 20b is, for example, an instruction resistor cell having a multiplexer. One input of the multiplexer is connected to another cell (not shown in FIG. 2) in the data path and the other input is connected to the terminal cell 22b via the wire 30b. Accordingly, an instruction can be externally input into the microcontroller chip 100. Furthermore, an instruction different from an instruction in an instruction memory provided in the microcontroller chip 100 can be given at the same timing as the instruction in the instruction memory provided in the microcontroller chip 100. Thus, a real-time emulation function can be realized.

The connectors 32a and 32b of the terminal cells 22a and 22b are used to mediate a communication between the external chip and the basic cells 20a and 20b, respectively. The connectors 32a and 32b are formed on an uppermost wiring layer of a plurality of wiring layers composing the terminal cells 22a and 22b.

On the other hand, wires provided in the data columns 12 in Y-direction as shown in FIG. 2 for connecting the basic cells 20 (20a, 20b) may be formed on the wiring layers other than the uppermost wiring layer. Thus, the connectors 32a and 32b of the terminal cells 22a and 22b can be formed without disturbing the wiring in the data columns in the data path.

Furthermore, the terminal cells 22a and 22b can be connected to the respective basic cells 20a and 20b by extending the wires above the terminal cells 22a and 22b and the basic cells 20a and 20b. Accordingly, regions for wiring are not necessary to connect the terminal cells to the basic cells. As a result, the terminal cells 22a and 22b can be arranged within an area having a minimum size.

Figure 6A:
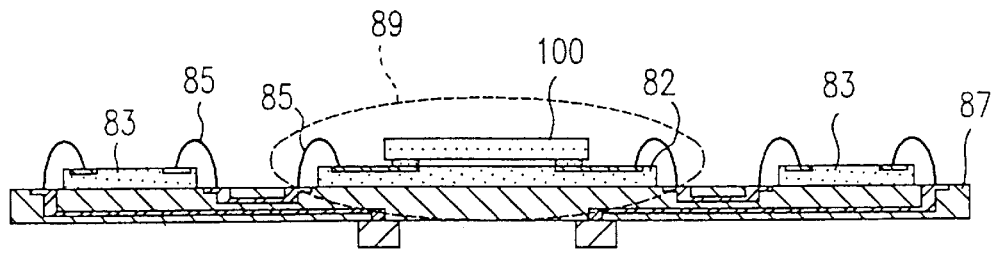
FIGS. 6A through 6C are cross-sectional views showing a microcontroller chip and an emulator chip being bonded with each other.

In order to monitor an internal signal in the microcontroller chip 100 via the connectors 32a and 32b of the terminal cells 22a and 22b and/or in order to supply an external signal into the microcontroller chip 100 via the connectors 32a and 32b of the terminal cells 22a and 22b, as shown in FIG. 6A, an emulator module 89 may be formed by bonding the microcontroller chip 100 and an emulator chip 82 with each other. The microcontroller chip 100 and the emulator chip 82 may be bonded by using, for example, a microbump bonding technique.

The emulator chip 82 is obtained by integrating a circuit realizing a real-time trace function and a circuit realizing a real-time emulation function on one chip. The emulator chip 82 has the function of processing the information required for real-time debugging.

Furthermore, as shown in FIG. 6A, the real-time emulation system can be realized by mounting the emulator module 89, a memory chip 83 for emulation and the like on a wiring substrate 87 and connecting each other with wires 85 or wires on or in the substrate.

Figure 6B:
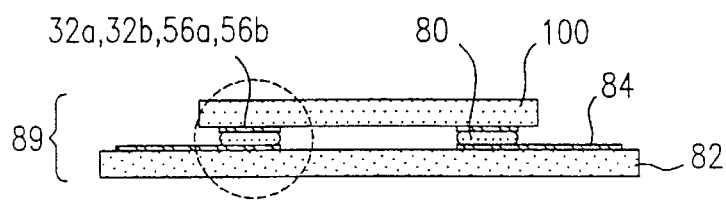

FIG. 6B is an enlargement of a circled portion of the emulator module 89 shown in FIG. 6A. The microcontroller chip 100 and the emulator chip 82 are bonded by forming metal bumps 80 on the connectors 32a and 32b of the microcontroller chip 100 and then connecting the connectors 32a and 32b to connectors 84 of the emulator chip 82 via the bumps 80. However, means for connecting the microcontroller chip 100 and the emulator chip 82 is not limited to bumps. Any means can be employed as long as the microcontroller chip 100 and the emulator chip 82 are electrically connected. For example, a fine wire can be used.

Figure 6C:
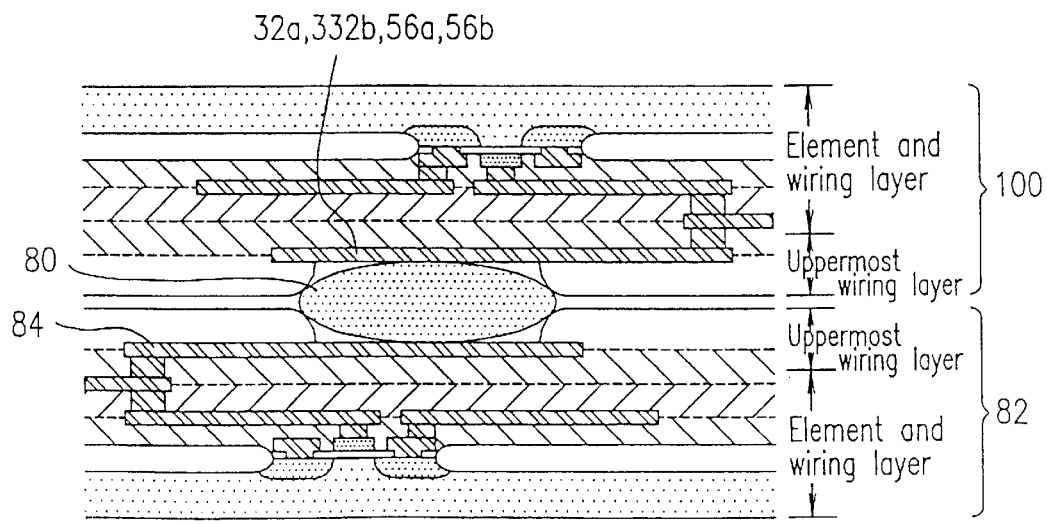

FIG. 6C is an enlargement of a circled portion of the connected portion between the microcontroller chip 100 and the emulator chip 82.

The emulator chip 82 includes element layers and wiring layers composing the circuit realizing the real-time trace function and the circuit realizing the real-time emulation function. The connectors 84 of the emulator chip 82 are formed on an uppermost wiring layer (connecting layer) above the element layers and the wiring layers of the emulator chip 82.

Figure 7:
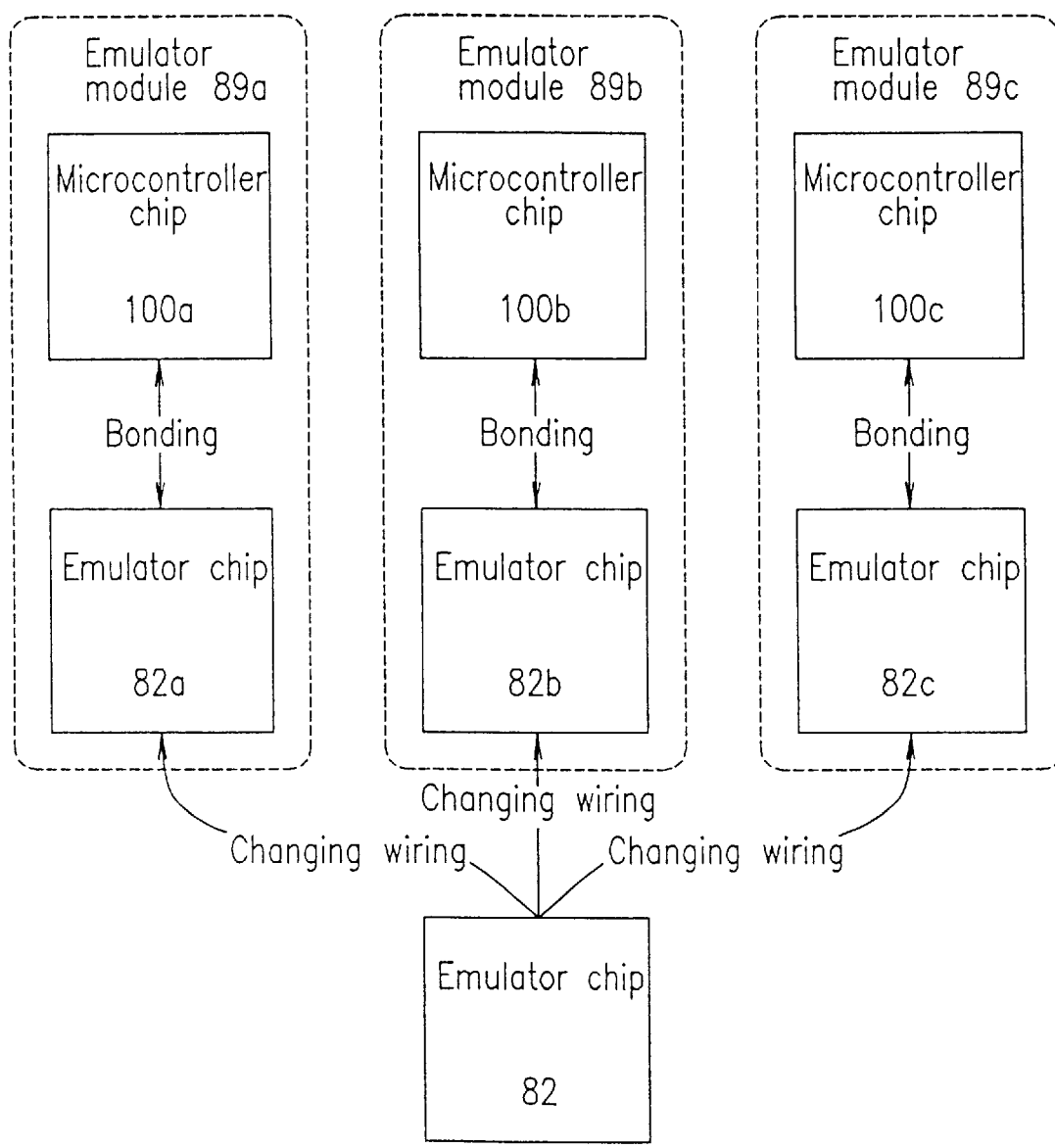
FIG. 7 is a schematic view showing microcontroller chips and emulator chips being bonded with each other.

FIG. 7 is a schematic view showing a manner of forming emulator modules 89a, 89b and 89c by bonding each of the microcontroller chips 100a, 100b and 100c with respective emulator chips 82a, 82b and 82c.

The positions of the connectors 32a and 32b in the respective microcontroller chips 100a, 100b and 100c are different from each other.

The emulator chip 82 has the function of processing information required for performing real-time debugging in any one of the microcontroller chips 100a, 100b and 100c.

The layers other than the uppermost wiring layer (connecting layer) of each of the emulator chips 82a, 82b and 82c are the same as those of the emulator chip 82. Each of the uppermost wiring layers (connecting layers) of the emulator chips 82a, 82b and 82c is formed so as to match the positions of the connectors 32a and 32b of the respective microcontroller chips 100a, 100b and 100c.

Thus, the emulator chips 82a, 82b and 82c of different kinds of microcontroller chips 100a, 100b and 100c can be realized with reduced number of development steps by simply changing the uppermost wiring layer (connecting layer) of the emulator chip 82.

Furthermore, in the case where the positions of the connectors 32a and 32b of the microcontroller chips 100a, 100b and 100c are the same, one kind of emulator chip can be commonly used to form various kinds of microcontroller chips 100a, 100b and 100c. Accordingly, the number of steps for developing an emulator chip can be minimized.

In the case where the present invention is applied to a circuit portion having irregular arrangement, unlike the above-described CPU data path section, as shown in FIG. 1, the terminal cells 23 can be collectively arranged at suitable positions between the functional blocks. Most of such signals are likely to be control-associated signals which are substantially small in number. Accordingly, even when the terminal cells 23 are arranged as shown in FIG. 1, there is small influence on the size of the area of the chip. Alternatively, the terminal cells 23 can be arranged in a functional block having a relatively large area such as a memory block.

Figure 3:
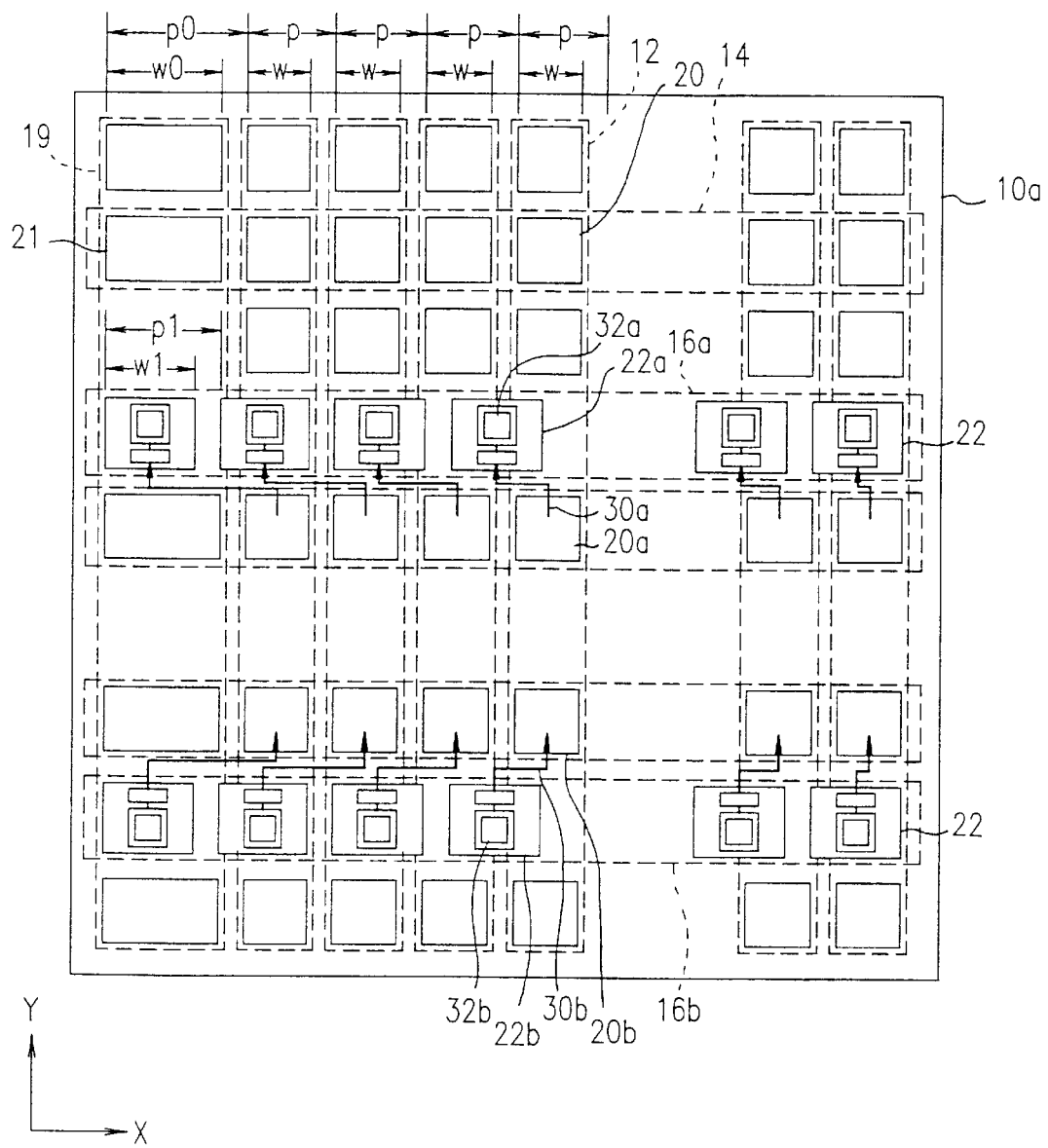
FIG. 3 is a plan view showing another configuration of basic cells and terminal cells in a functional block in the microcontroller chip according to the first example of the present invention.

FIG. 3 is a schematic view showing another arrangement of the basic cells 20 and the terminal cells 22a and 22b.

The functional block 10a includes a plurality of data columns 12. Each of the plurality of data columns 12 extends in Y-direction and are regularly arranged with pitch p in X-direction.

The functional block 10a further includes a control column 19. The control column 19 extends in Y-direction and is arranged with pitch p0 in X-direction. The control column 19 includes a plurality of control circuits 21. Each of the control circuits 21 may include, for example, a control signal generating circuit and/or a signal driving circuit. Each control circuit 21 has a width w0.

The functional block 10a further includes a plurality of data rows 14. Each of the plurality of data rows 14 extends in X-direction and include a plurality of basic cells 20. The basic cells 20 are arranged with pitch p in X-direction. Each basic cell 20 has a width w.

The functional block 10a further includes terminal cell rows 16a and 16b. Each of the terminal cell rows 16a and 16b extends in X-direction. The terminal cell rows 16a and 16b include a plurality of terminal cells 22a and 22b, respectively. The terminal cells 22a and 22b are arranged with pitch p1 in X-direction. Each of the terminal cells 22a and 22b has a width w1. Herein, w1 is assumed to be 1.15×w.

The functional block 10a may include only a single terminal cell row.

As shown in FIG. 3, the basic cell 20a is connected to the terminal cell 22a via the wire 30a. Similarly, the basic cell 20b is connected to the terminal cell 22b via the wire 30b.

Additionally, the basic cell 20a and the terminal cell 22a connected thereto are arranged so as to be adjacent to each other. Similarly, the basic cell 20b and the terminal cell 22b connected thereto are arranged so as to be adjacent to each other.

For the sake of simplification of the description, pitch p, pitch p0 and pitch p1 are referred to as width w, width w0 and width w1, respectively. The pitch and the width are distinguished because source wires or grounding wires may be provided between the basic cells 20 (20a, 20b).

As described above, in the exemplary CPU data path section, each of the plurality of data columns 12 corresponds to 1 bit in a signal having a 32 bit width. In this case, each data row 14 has a width (32×w+w0) and each of the terminal cell rows 16a and 16b have a width (32×w1).

When the control circuit 21 has a width w0 (=4.8×w), the width of the data rows 14 and the width of the terminal cell rows 16a and 16b become equal. This is because an equation 32×w+w0=32×w1 is satisfied when w0 is 4.8×w since w1 is assumed to be 1.15×w.

Instead of the control circuit 21, each of the terminal cell rows 16a and 16b includes the terminal cell 22a and 22b, respectively, in a region corresponding to the control column 19. Since each of the terminal cells 22a and 22b has a single fixed function, no control is required. Thus, it is not necessary to provide the control circuits 21 in the terminal cell rows 16a and 16b.

Such an arrangement of the terminal cells 22a and 22b allows the whole width of the functional block 10a to be efficiently used.

Even in the case where control signals are required in the terminal cells 22a and 22b, the number of the control signals are considered substantially less. Therefore, the control signals can be directly supplied to the terminal cells 22a and 22b from outside of the functional block 10a.

Figure 4:
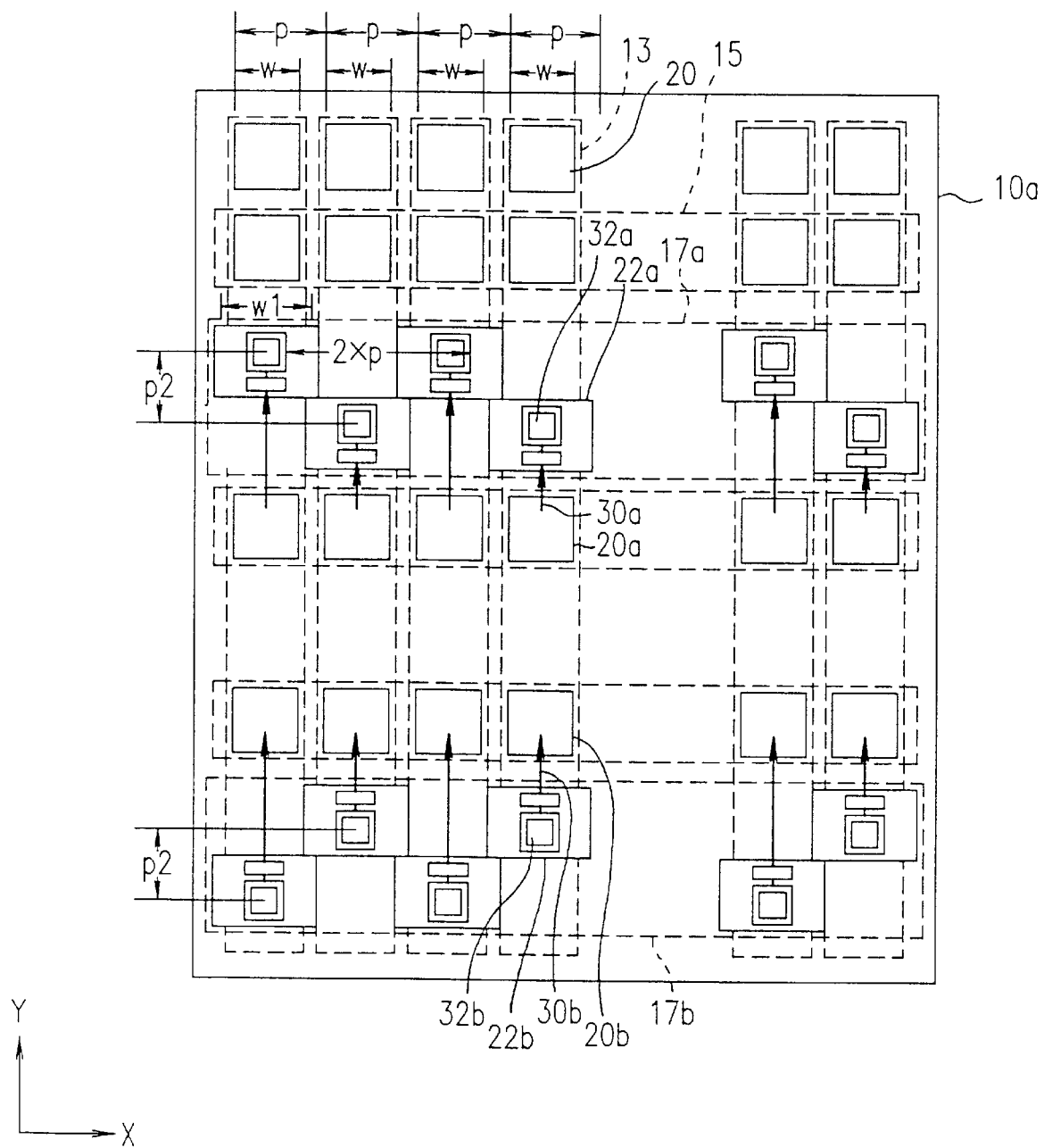
FIG. 4 is a plan view showing another configuration of basic cells and terminal cells in a functional block in the microcontroller chip according to the first example of the present invention.

FIG. 4 is a plan view showing a functional block 10a employing another arrangement of the basic cells 20 and the terminal cells 22a and 22b.

The functional block 10a includes a plurality of data columns 13. Each of the plurality of data columns 13 extends in Y-direction and is regularly arranged in X-direction with pitch p.

The functional block 10a further includes a plurality of data rows 15. Each of the plurality of data rows 15 extends in X-direction and includes a plurality of basic cells 20. The basic cells 20 are arranged in X-direction with pitch p. Each basic cell 20 has a width w.

The functional block 10a further includes terminal cell rows 17a and 17b. Each of the terminal cell rows 17a and 17b extends in X-direction. The terminal cell rows 17a and 17b include a plurality of terminal cells 22a and 22b, respectively. The terminal cells 22a and 22b are alternately provided in Y-direction with pitch p2 so as to be arranged in zigzags in the X-direction with pitch 2×p. Each of the terminal cells 22a and each of the terminal cells 22b has a width w1. Herein, w1 is 1.15×w.

The functional block 10a may include only a single terminal cell row.

As shown in FIG. 4, the basic cells 20a are connected to the terminal cells 22a via wires 30a. The basic cells 20b are connected to the terminal cells 22b via wires 30b.

The basic cells 20a and the terminal cells 22a connected thereto are arranged so as to be adjacent to each other in Y-direction. Similarly, the basic cells 20b and the terminal cells 22b connected thereto are arranged so as to be adjacent to each other in Y-direction.

For the sake of simplification of the description, the pitch p is referred to as width w. The pitch and the width are distinguished since source wires or grounding wires may be provided between the basic cells 20 (20a, 20b).

As described above, in the exemplary CPU data bus section, each of the plurality of data columns 13 corresponds to 1 bit in a signal having a 32 bit width. In this case, each data row 15 has a width (32×w) and each of the terminal cell rows 17a and 17b have a width (31×w+w1).

Since w1 is 1.15×w, the difference between each of the width of the terminal cell rows 17a and 17b and the width of the data row 15 is 31×w+1.15×w−32×w, i.e., 0.15×w. This difference is equal to a difference between the width of each terminal cells 22a and 22b and the width of each basic cell 20 (20a, 20b). Specifically, the width of each terminal cell rows 17a and 17b is 0.15×w wider than the width of each data row 15. However, such a difference is negligibly small in regard to the width of the data rows 15 and thus, no problem is caused.

Since the terminal cells 22a and 22b are arranged in zigzags, the area size of each of the terminal cell rows 17a and 17b needs to be as large as the area can accommodate the upper and the lower terminal cells 22a and 22b. However, since the terminal cells 22a or 22b and the respective basic cells 20a and 20b connected thereto are arranged in the same column, wiring can be conducted within the data column 13 above the basic cells 20 (20a, 20b). Thus, no additional region is necessary to be provided between the data rows 15 and the terminal cell rows 17a and 17b.

Figure 9:
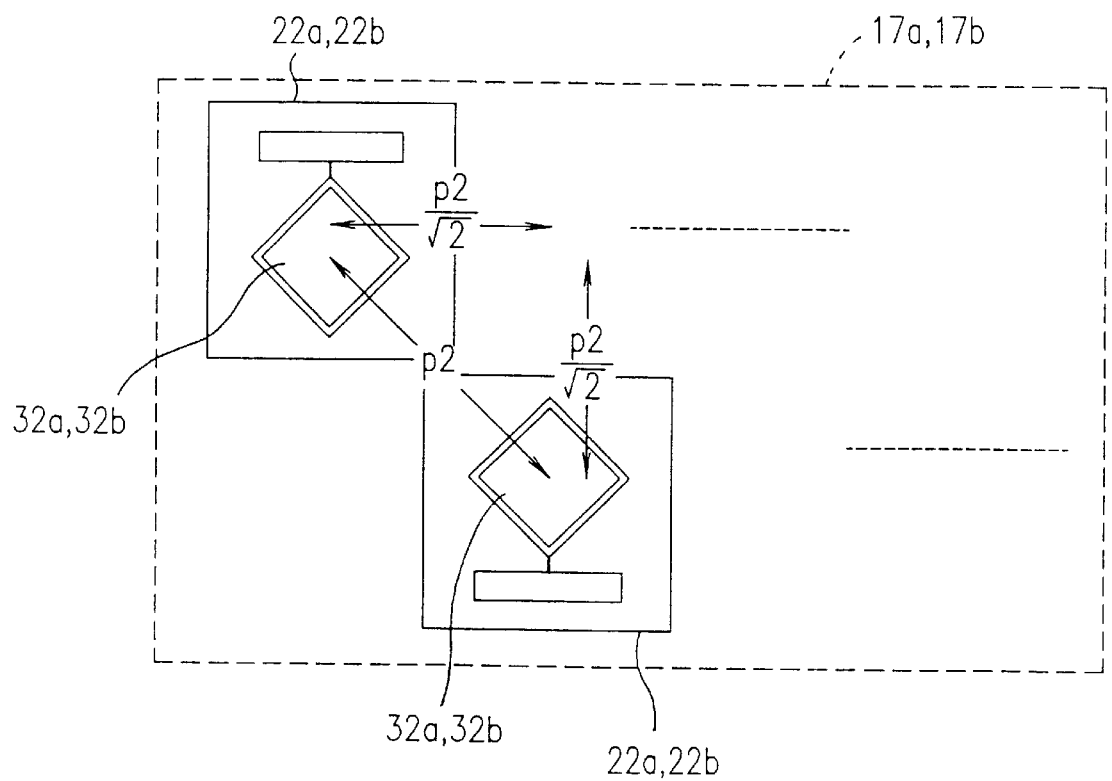
FIG. 9 is a brief plan view showing terminal cells arranged in zigzags.
Figure 10A:
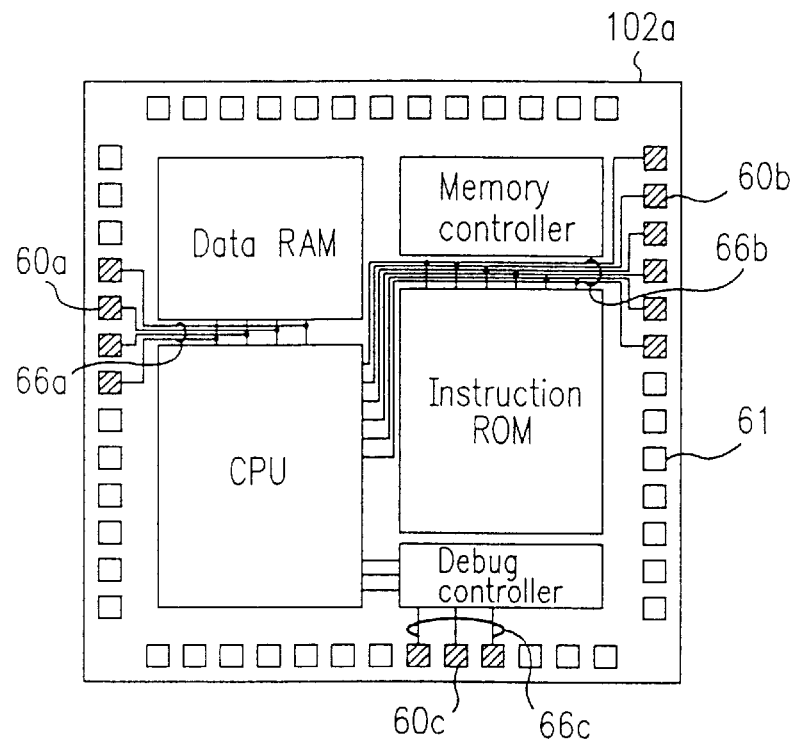
FIGS. 10A and 10B are plan views showing conventional evaluation chips 102a and 102b, respectively.
Figure 10B:
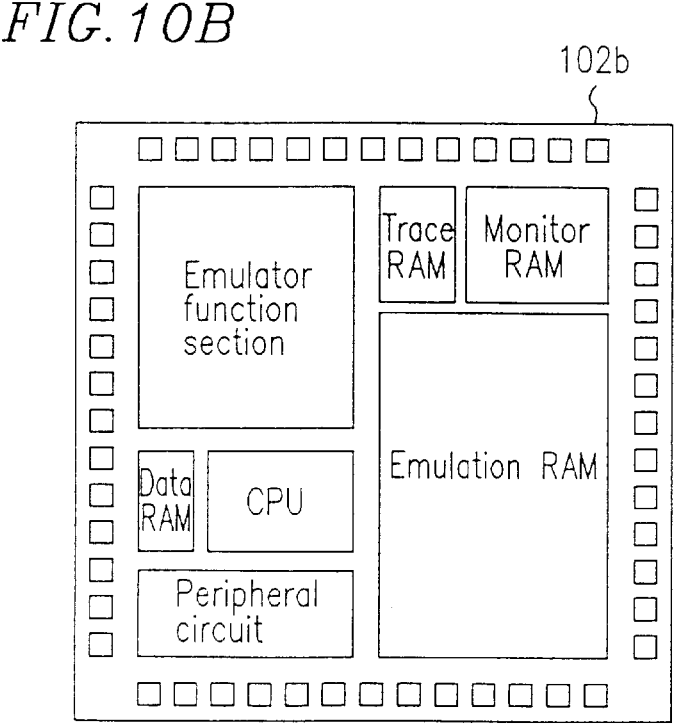

In the functional block 10a shown in FIG. 4, as well as the functional blocks 10a shown in FIGS. 2 and 3, the connectors 32a and 32b have a rectangular shape. In order to control the increase in the length of the terminal cells 22a and 22b in Y-direction caused by the zigzag arrangement, the rectangular-shaped connectors 32a and 32b may be rotated by 45° as shown in FIG. 9. As a result, the pitch in Y-direction can be as small as p2/$\sqrt{2}$. The same effect can be obtained when the shape of the connectors 32a and 32b is a circle.

According to the first example of the present invention, the terminal cells 22a and 22b are regularly arranged within the functional block 10a of the microcontroller chip 100. Accordingly, the distance between the basic cells 20a and the terminal cells 22a and between the basic cells 20b and the terminal cells 22b can be as short and uniform as possible. At the same time, the size of the areas for wiring can be minimized. Thus, influence associated with an increase in the size of the area and an increase in the wiring delay of the microcontroller chip 100 can be minimized.

Furthermore, the microcontroller chip 100 can be commonly used as an evaluation chip and a mass-produced chip. As a result, the number of the development steps can be reduced.

Moreover, the microcontroller chip 100 is applicable to an emulator module 89 having an equivalent function as that of the evaluation chip 102b. The electrical characteristics of the microcontroller chip 100 and electrical characteristics of the emulator module 89 can be extremely equal.

The terminal cells 22a and 22b are regularly arranged so that the distance between the basic cells 20a and the terminal cells 22a and the distance between the basic cells 20b and the terminal cells 22b can be as short and uniform as possible. At the same time, and the size of the wiring areas are minimized. Such a structure is applicable to a semiconductor integrated circuit device which uses semiconductor integrated circuit devices produced by different processes as one substrate by bonding the semiconductor integrated circuit devices. Specifically, examples of the combination of the semiconductor integrated circuit device include a microcontroller chip and a DRAM (Dynamic Random Access Memory), a microcontroller chip and a semiconductor integrated circuit for processing analog signals and a microcontroller chip with a built-in flash memory (i.e., an electrically rewritable read-only memory) and a DRAM.

EXAMPLE 2

Figure 5:
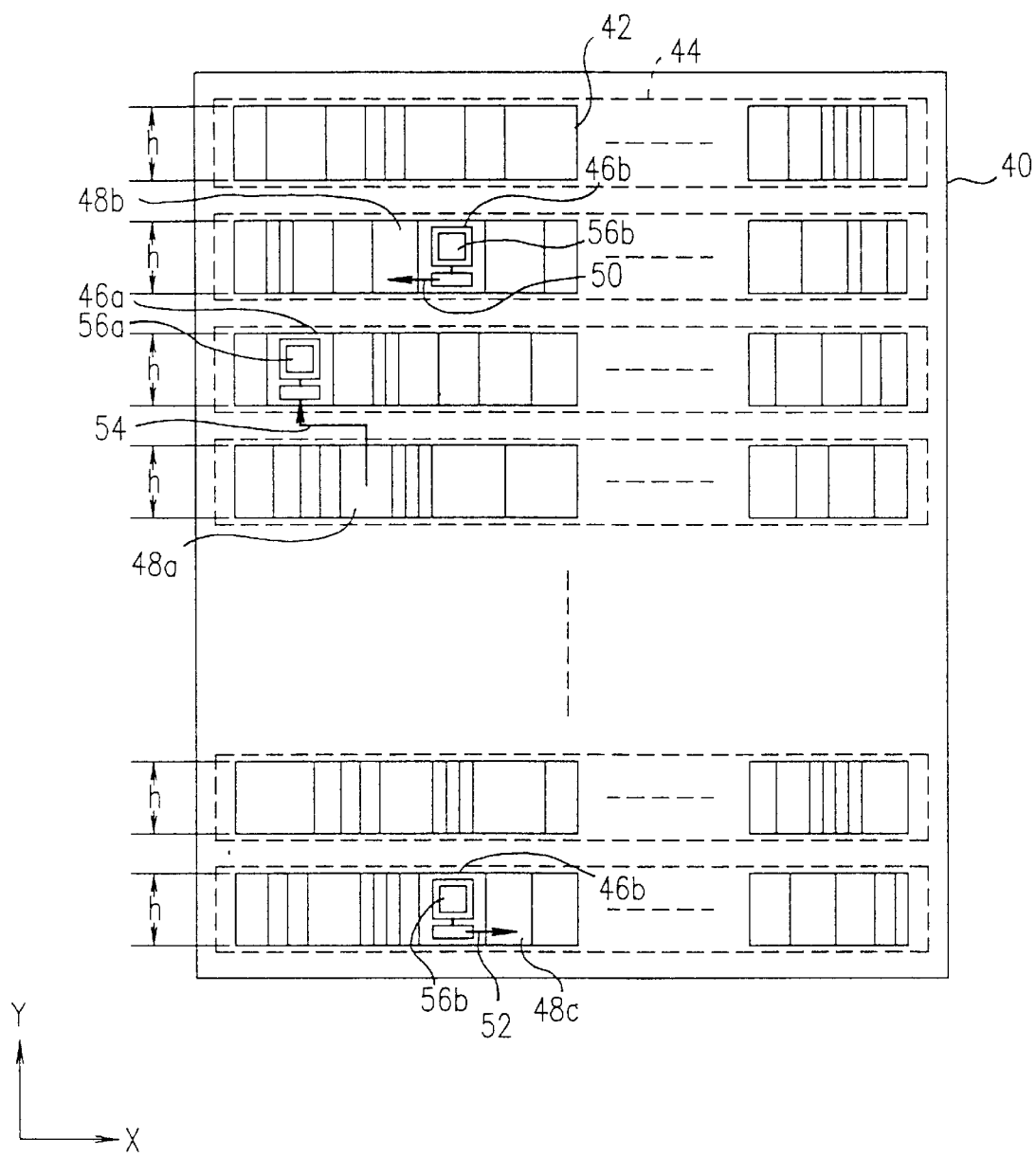
FIG. 5 is a plan view showing a configuration of basic cells and terminal cells in a functional block according to a second example of the present invention.

FIG. 5 is a plan view showing a configuration of a functional block 40. The functional block 40 may be one of a plurality of functional blocks included in the microcontroller chip 100.

The functional block 40 includes a plurality of rows 44. Each of the plurality of rows 44 extends in X-direction and are arranged in parallel while maintaining regions are provided separating the adjacent rows 44 where wires are provided.

Each of the plurality of rows 44 includes a plurality of standard cells 42. Each of the plurality of standard cells 42 has a uniform length h.

Terminal cells 46a and 46b have the same functions and configurations as the terminal cells 22a and 22b described in the first example and have the same length h as the standard cells 42. Each of the terminal cells 46a and 46b is connected to the adjacent standard cell 42 in the same row or to the adjacent standard cell 42 in the adjacent row.

For example, in FIG. 5, the terminal cell 46b included in the second row 44 from the top is connected to the standard cell 48b included in the same row 44 via a wire 50. The wire 50 extends above the standard cell 48b. The terminal cell 46a included in the third row 44 from the top is connected to the standard cell 48a included in the adjacent row 44 via a channel wire 54 extending between the rows 44. The terminal cell 46b included in the lowest row 44 is connected to the standard cell 48c included in the same row via a wire 52. The wire 52 extends above the standard cell 48c.

The wiring among the standard cells 42 is conducted by avoiding the connectors 56a and 56b of the terminal cells 46a and 46b, or by using a wiring layer different from the layers composing the connectors 56a and 56b. Additionally, the wiring among the standard cells 42 is collectively conducted with the other wiring in the functional block 40.

According to the second example of the present invention, the arrangement of the terminal cells 46a and 46b and the standard cells 42 and the wiring thereof are collectively conducted in the functional block 40 in the microcontroller chip 100. Accordingly, the distance between the standard cells 48a, 48b and 48c and the terminal cells 46a and 46b can be as short and uniform as possible and the size of the areas for wiring can be minimized. As a result, influence associated with an increase in the area size and an increase in the wiring delay of the microcontroller chip 100 can be minimized.

Furthermore, the microcontroller chip 100 can be commonly used as an evaluation chip and a mass-produced chip. As a result, the number of the development steps can be reduced.

Moreover, the microcontroller chip 100 is applicable to an emulator module 89 having an equivalent function as that of the evaluation chip 102b. The electrical characteristics of the microcontroller chip 100 and electrical characteristics of the emulator module 89 can be extremely equal.

A semiconductor integrated circuit according to the present invention includes a plurality of terminal cells each having a connector for mediating a communication between one of a plurality of basic cells and another semiconductor integrated circuit. The semiconductor integrated circuit and another semiconductor integrated circuit are bonded so as to form a module. Such a bonding allows the semiconductor integrated circuit to be adopted to various kinds of semiconductor integrated circuits by simply changing a part of the another semiconductor integrated circuit (i.e., a connecting layer). Accordingly, the number of steps required for developing a module is reduced.

Moreover, by regularly arranging a plurality of basic cells and a plurality of terminal cells, influence associated with an increase in the area size and an increase in a wiring delay of the semiconductor integrated circuit can be minimized. Accordingly, the semiconductor integrated circuit used for evaluation can be also used as a mass-produced semiconductor integrated circuit. Thus, the number of steps for developing the semiconductor integrated circuit used for evaluation and the mass-produced semiconductor integrated circuit can be reduced.

Similar effects are obtained for a system incorporating the above-described semiconductor integrated circuit.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A semiconductor integrated circuit comprising a functional block realizing at least part of a function of the semiconductor integrated circuit, wherein:

the functional block includes a plurality of basic cells and a plurality of terminal cells; and each of the plurality of terminal cells has a connector for mediating a communication between another semiconductor integrated circuit and one of the plurality of basic cells.

2. A semiconductor integrated circuit according to claim 1, wherein each of the plurality of terminal cells is adjacent to at least one of the plurality of basic cells.

3. A semiconductor integrated circuit according to claim 1, wherein the communication is established by using an internal signal of the semiconductor integrated circuit.

4. A semiconductor integrated circuit according to claim 3, wherein another semiconductor integrated circuit has a function of processing information required for real-time debugging.

5. A semiconductor integrated circuit according to claim 1, wherein the communication is established by using an external signal of the semiconductor integrated circuit.

6. A semiconductor integrated circuit according to claim 1, wherein at least two of the plurality of basic cells are arranged in a first predetermined direction.

7. A semiconductor integrated circuit according to claim 6, wherein at least two of the plurality of terminal cells are arranged in a second predetermined direction.

8. A semiconductor integrated circuit according to claim 7, wherein an arrangement pitch of each of the terminal cells are equal to an arrangement pitch of each of the basic cells.

9. A semiconductor integrated circuit according to claim 8, wherein a width of each of the terminal cells is equal to a width of each of the basic cells.

10. A semiconductor integrated circuit according to claim 7, wherein an arrangement pitch of each of the terminal cells is larger than an arrangement pitch of each of the basic cells.

11. A semiconductor integrated circuit according to claim 10, wherein:

the functional block includes a region for a control circuit to be formed; and at least one of the plurality of terminal cells is provided in at least part of the region.

12. A semiconductor integrated circuit according to claim 10, wherein each of the plurality of terminal cells is arranged in zigzags.

13. A semiconductor integrated circuit according to claim 1, wherein each of the plurality of terminal cells is any one of an input terminal cell, an output terminal cell and an input and output terminal cell.

14. A system comprising a first semiconductor integrated circuit, a second semiconductor integrated circuit and a connecting medium for connecting the first semiconductor integrated circuit and the second semiconductor integrated circuit, wherein:

the first semiconductor integrated circuit includes a functional block realizing at least part of a function of the first semiconductor integrated circuit;

the functional block includes a plurality of basic cells and a plurality of terminal cells;

each of the plurality of terminal cells has a connector for mediating a communication between the second semiconductor integrated circuit and one of the plurality of basic cells; and the second semiconductor integrated circuit has a function of processing information required for real-time debugging.

15. A system according to claim 14, wherein the connecting medium is a bump.

16. A system according to claim 14, wherein:

the first semiconductor integrated circuit is one selected from a plurality of semiconductor integrated circuits; and the second semiconductor integrated circuit has a function of processing information required for real-time debugging any one of the plurality of semiconductor integrated circuits.

17. A system according to claim 16, wherein a connecting layer of the second semiconductor integrated circuit is provided so as to adapt a connecting layer of the one selected from the plurality of the semiconductor integrated circuits.

18. A system according to claim 16, wherein a connecting layer of the second semiconductor integrated circuit is provided so as to adopt all of the plurality of semiconductor integrated circuits.

* * * * *

UNITED STATES PATENT AND TRADE MARK OFFICE
CERTIFICATE OF CORRECTION

PATENT NO. : 5,835,505
DATED : November 10, 1998
INVENTOR(S) : Nishimichi et al.

It is certified that error appears in the above-identified patent and that said Letters Patent is hereby corrected as shown below:

Cover page, item [56] References Cited, Other Documents, list the following:

H. Katuda et al., "32-Bit Microcontroller for Evaluation Including All Functions of In-Circuit Emulator (ICE)", NIKKEI ELECTRONICS, No. 623, pgs. 99-109, December 5, 1994.

"SH-3 With Enhanced Software-Based Power Control Function Developed by Hitachi", NIKKEI ELECTRONICS, No. 631, pgs. 21-22, March 13, 1995.

Signed and Sealed this

Second Day of November, 1999

Attest:

Q. TODD DICKINSON

*Attesting Officer*    *Acting Commissioner of Patents and Trademarks*